United States Patent
Nelson et al.

(10) Patent No.: US 9,937,750 B1
(45) Date of Patent: Apr. 10, 2018

(54) CASTER WHEEL TILT BAR

(71) Applicants: Chris Nelson, Riverside, CA (US);
Adolfo Gutirrez, Riverside, CA (US)

(72) Inventors: Chris Nelson, Riverside, CA (US);
Adolfo Gutirrez, Riverside, CA (US)

( * ) Notice: Subject to any disclaimer, the term of this patent is extended or adjusted under 35 U.S.C. 154(b) by 0 days.

(21) Appl. No.: 15/432,071

(22) Filed: Feb. 14, 2017

(51) Int. Cl.
*B60B 33/00* (2006.01)

(52) U.S. Cl.
CPC .......... *B60B 33/00* (2013.01); *B60B 2200/43* (2013.01); *B60B 2200/432* (2013.01)

(58) Field of Classification Search
CPC ... B60B 33/00; B60B 33/021; B60B 33/0078; B60B 33/0089; B60B 33/045; B60B 33/04; B60B 33/06; B60B 2200/43; B60B 2200/432; B60B 2200/434; B60G 11/02
See application file for complete search history.

(56) References Cited

U.S. PATENT DOCUMENTS

| | | | | |
|---|---|---|---|---|
| 1,731,640 A * | 10/1929 | Thurlby | .................. | B60B 33/06 16/34 |
| 2,450,062 A * | 9/1948 | Voss | ........................ | A47L 9/009 16/18 CG |
| 2,830,545 A * | 4/1958 | Robinson | ................ | B60B 33/00 105/170 |
| 3,217,839 A * | 11/1965 | Watkins | .............. | B60B 33/0078 188/4 R |
| 3,239,872 A * | 3/1966 | Kitrell | ...................... | A61G 5/06 16/18 B |
| 3,691,590 A * | 9/1972 | Drabert | .................... | B60B 33/00 16/18 CG |
| 4,025,099 A * | 5/1977 | Virden | .................... | B60B 33/00 16/18 CG |
| 5,564,722 A * | 10/1996 | Cimo | ........................ | B62B 1/22 280/47.3 |
| 5,775,870 A | 7/1998 | Hogan | | |
| 5,884,924 A * | 3/1999 | Fairchild | .................. | B62B 1/18 280/47.31 |
| D407,630 S * | 4/1999 | Tieken | .......................... | D8/375 |
| 6,123,343 A | 9/2000 | Nolting, Jr. et al. | | |
| 6,183,405 B1 * | 2/2001 | Schurig | ............... | B60B 33/0039 16/18 B |
| 6,554,301 B2 * | 4/2003 | Scott | ........................ | B62B 1/20 280/47.12 |

(Continued)

FOREIGN PATENT DOCUMENTS

JP 10057419 A * 3/1998

*Primary Examiner* — Chuck Mah
(74) *Attorney, Agent, or Firm* — Kirk A. Buhler; Buhler & Associates

(57) ABSTRACT

Improvements in a caster wheel tilt bar is disclosed. The caster wheel tilt bar is installable and removeable on a caster and is secured over one side of the caster frame and utilizes the tapered portion of the wheel frame. When the cart frame is rotated the tilt bar comes in contact with the ground. Further rotation lifts the wheel above the ground. The tilt bar can be configured in an arc or can be configured with defined angular steps. The angular steps are generally calculated to create a balance point where the cart can hold with limited rocking. The caster wheel tilt bar can also be painted or powder coated to match the color of the pre-existing caster wheel. Because the rod and shoe can be different components, the shoe or rod can be adjusted to accommodate different casters and/or wheel diameters.

11 Claims, 5 Drawing Sheets

(56) References Cited

U.S. PATENT DOCUMENTS

| | | | |
|---|---|---|---|
| 6,588,799 B1 | 7/2003 | Sanchez | |
| 6,764,093 B2 * | 7/2004 | Allsop | B62B 1/147 220/9.4 |
| 7,036,185 B2 * | 5/2006 | Morndal | B60B 33/04 16/18 B |
| 7,225,903 B2 * | 6/2007 | Nebolon | B62B 3/14 188/19 |
| 7,753,177 B2 | 7/2010 | Slager | |
| 8,214,970 B2 * | 7/2012 | Sullivan | A61G 5/06 16/18 B |
| 8,650,710 B1 * | 2/2014 | Waggener | B60B 33/006 16/18 B |
| 9,108,462 B1 * | 8/2015 | Stone | B60B 33/0023 |
| 9,120,499 B2 * | 9/2015 | Michel, Jr. | B62B 1/18 |
| 2006/0113733 A1 * | 6/2006 | Kazaoka | A61G 5/06 280/5.24 |
| 2009/0295109 A1 * | 12/2009 | Winter | B62B 1/14 280/47.34 |
| 2015/0329131 A1 * | 11/2015 | Dumas | B62B 1/202 280/47.31 |

* cited by examiner

CASTER WHEEL TILT BAR

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in caster wheel tilt bar. More particularly, the present caster wheel tilt bar is integrated with or is configured to mount on a cater wheel to prevent rotation of the wheel when a cart is lifted.

Description of Related Art including information disclosed under 37 CFR 1.97 and 1.98

Carts are generally configured to roll along a surface. In some instances, it is desired to stop the cart and tilt the basket to empty or dump the load. The dumping can be accomplished by bringing the wheel against a stop that stops the wheel from rolling whereby the cart can be lifted. Another method is to apply a brake that stops the wheel from rolling, still another method is to lift or rock the cart to tip the contents out of the cart.

A number of patents and or publications have been made to address these issues. Exemplary examples of patents and or publication that try to address this/these problem(s) are identified and discussed below.

U.S. Pat. No. 5,775,870 was issued on Jul. 7, 1998 to Sherman David Hogan titled Vehicle Side Tilting Apparatus. This patent discloses a vehicle side tilting apparatus having strap-on wheel rockers to attach to wheels at one side of a vehicle and lift structure to elevate the other side of the vehicle and to roll the vehicle on the wheel rockers until the raised side of the vehicle is upright or slightly over center. This patent is not configured to mount onto the wheel(s) of a vehicle, a vehicle drives onto the apparatus to enable tilting the vehicle.

U.S. Pat. No. 6,123,343 was issued on Sep. 26, 2000 to Herman F. Nolting Jr. et al and is titled Cart Braking Mechanism. This patent discloses a braking mechanism for a grocery cart or the like is disclosed as including a braking assembly that is selectively shiftable between braking and non-braking positions and a handle assembly interconnected to the braking assembly for effecting the selective brake assembly shifting. The braking assembly includes a chock element shiftably mounted adjacent at least one of the cart wheels. This patent is essentially a braking system and allows a user to stop the rolling motion of the cart, but it must be integrated into the entire cart.

U.S. Pat. No. 7,753,177 was issued on Jul. 13, 2010 to Rita Slager and is titled Wheel Chock Assembly. This patent discloses a wheel chock assembly is provided having a base member extending axially from a top end to a bottom end, first and second support members whose upper ends are pivotally and slidably engaged with respect to the base member, first and second wheel chocks mounted with respect to the lower ends of the support members, and an adjustment mechanism mounted to the base member. This patent is essentially a set of dowels that engage on opposite sides of a wheel to prevent the wheel from rolling. It does not allow a cart to rock over onto a member that is secured to the wheel. Many of these solutions require the stopping mechanism to be built into the cart when it is made.

What is needed is a caster wheel tilt bar formed as a shoe or bayonet that can be secured onto a custom or generic caster wheel of a cart. The caster wheel tilt bar in this document provides the solution.

BRIEF SUMMARY OF THE INVENTION

It is an object of the caster wheel tilt bar to be installed and removed on a caster. The ability to install and remove the tilt bar allows it to be incorporated into nearly any cart that has a caster. A caster is a fairly standard type of wheel that is used in shopping carts and flat carts. These carts are produced is high quantity using fairly generic casters. The caster wheel tilt bar slips over one side of the caster frame and utilizes the tapered portion of the wheel frame. The bar itself could also be welded or otherwise secured directly onto the caster frame.

It is an object of the caster wheel tilt bar to lift the caster wheel off the ground. Under normal use of rolling the caster, the tilt bar is elevated from the ground surface. When the cart frame is rotated the tilt bar comes in contact with the ground. Further rotation of the cart lifts the wheel above the ground. With the wheel elevated the cart is prevented from rolling and the contents of the cart can be dumped or otherwise emptied (or filled). When the cart is rotated back to a normal use angle the wheel will make contact with the ground and the cart is used in its normal configuration.

It is an object of the caster wheel tilt bar to be bolted through the axle of the caster wheel. While friction can hold the caster wheel tilt bar onto a caster wheel, the caster wheel tilt bar is configured with a hole whereby the axle bolt of the caster wheel can be removed, the caster wheel tilt bar installed and the axle bolt is returned through the axle. The caster wheel tilt bar can be removed in a reverse order where the caster wheel tilt bar can be used on other carts.

It is an object of the caster wheel tilt bar to have at least one angle that provides a stop. The tilt bar can be configured in an arc or can be configured with defined angular steps. The angular steps are generally calculated to create a balance point where the cart can hold with limited rocking.

It is another object of the caster wheel tilt bar to be constructed of metal material that is similar to the caster wheel frame. The caster wheel tilt bar can also be painted or powder coated to match the color of the pre-existing caster wheel.

It is still another object of the caster wheel tilt bar to be constructed with a base shoe and rod. The rod is welded or otherwise secured to the shoe. Because the rod and shoe are different components, the shoe or rod can be adjusted to accommodate different casters and/or wheel diameters.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
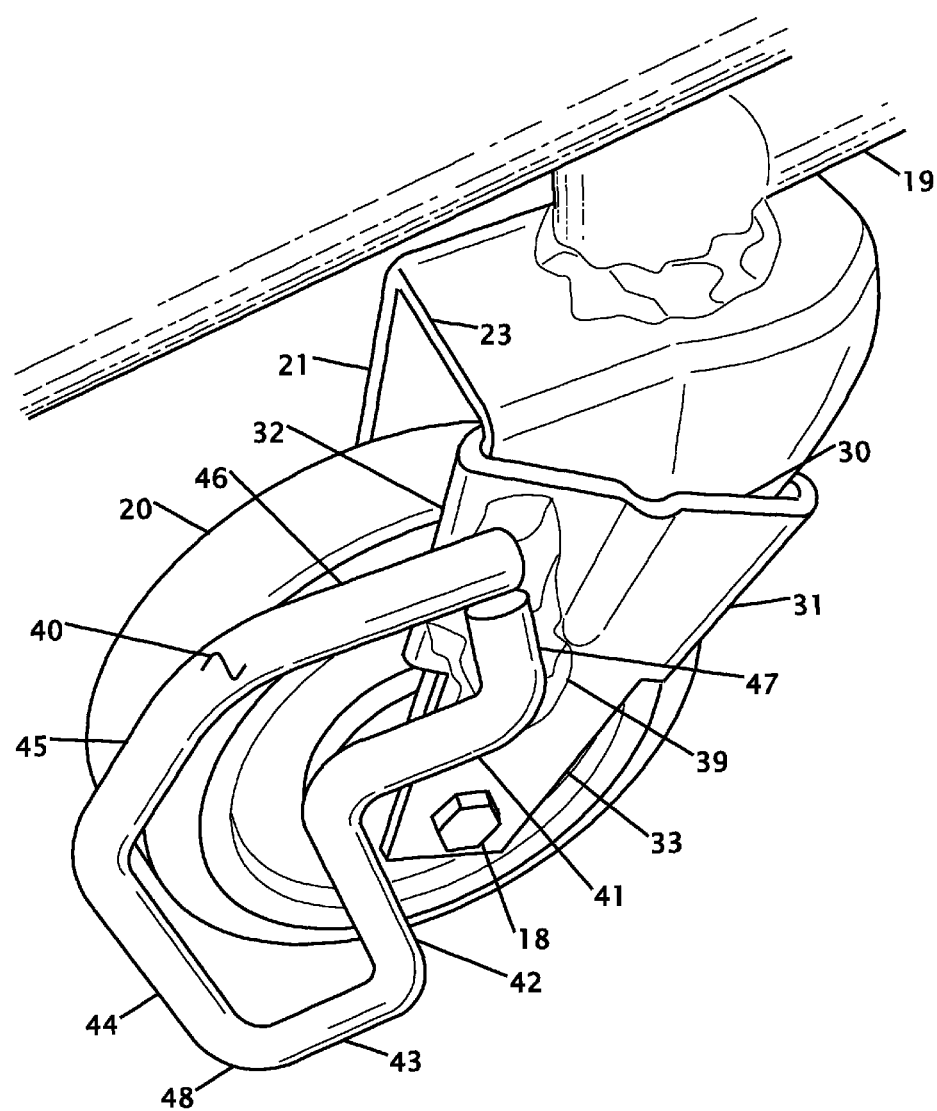
FIG. 1 shows a perspective view of the caster wheel tilt bar.

FIG. 1 shows a perspective view of the caster wheel tilt bar. In this embodiment, the caster wheel tilt bar has two components. The first component is a shoe 30 or bayonet. The shoe 30 has a face plate 33 and flanges 31 and 32 on opposing elongated sides of the face plate 30. The flanges 31 and 32 are bent from the face plate and at least partially wrap around an inner surface of the face plate. The shoe wraps around a flange of the outside 24 of the caster frame 23. The face plate 30 and flanges 31 and 32 are configured to engage on at least one side 24 of a caster frame 23. The caster 23 frame has two sides 21 and 24 that extend from the top portion of the caster that is secured to the cart frame 19. The cart can be a shopping cart, a flat bend cart or other apparatus that utilizes a caster. The outer frame sides 21 and 24 of the caster support a wheel 20 that is supported with an axle. In this figure the axle is a bolt axle 18 that can be removed to hold the caster wheel tilt bar. The shoe 30 is formed in a tapered configuration to provide an interference or pinch fit on the caster leg 24.

The second component of the caster wheel tilt bar is a tilt bar 40 that is secured to an outer surface of the face plate 33. The tilt bar 40 is secured to the shoe by welding 39 or the like. The tilt bar 40 is formed in a loop that extends beyond the face plate 33 of the shoe 30. In this embodiment, the tilt bar 40 is shown with a series of bends and straights 41, 42, 43, 44, 45,46 and 47. The lower front bend 48 is generally the first point of contact when the cart 19 is rotated onto the resting edge 44 of the tilt bar 40. The tilt bar 40 at least partially extends beyond the wheel to enable the tilt bar 40 to lift the wheel 20 off of a ground surface. In this embodiment, the tilt bar 40 begins and terminates on the shoe face 33, but other embodiments are contemplated where the tilt bar 40 is secured to the shoe at only one end. It is further contemplated that the shoe 30 can be formed with an integrated tilt bar as a single member formed completely from sheet material. In the preferred embodiment, the tilt bar 40 is formed from round, square or flat bar or tubular material.

The face plate 33 has a hole where axle bolt 18 is inserted to secure the shoe onto the caster frame 23. The hole in the caster corresponds to an axle of the caster. The use of the hole and bolt 18 ensures that the shoe 30 is locked on to the caster. In use, rotation of the cart rotates the caster with a wheel 20 and the caster wheel tilt bar 40 to elevate the wheel above ground surface. This is shown and described in other figures herein. Because the rod and shoe can be different components, the shoe or rod can be adjusted to accommodate different casters and/or wheel diameters.

Figure 2:
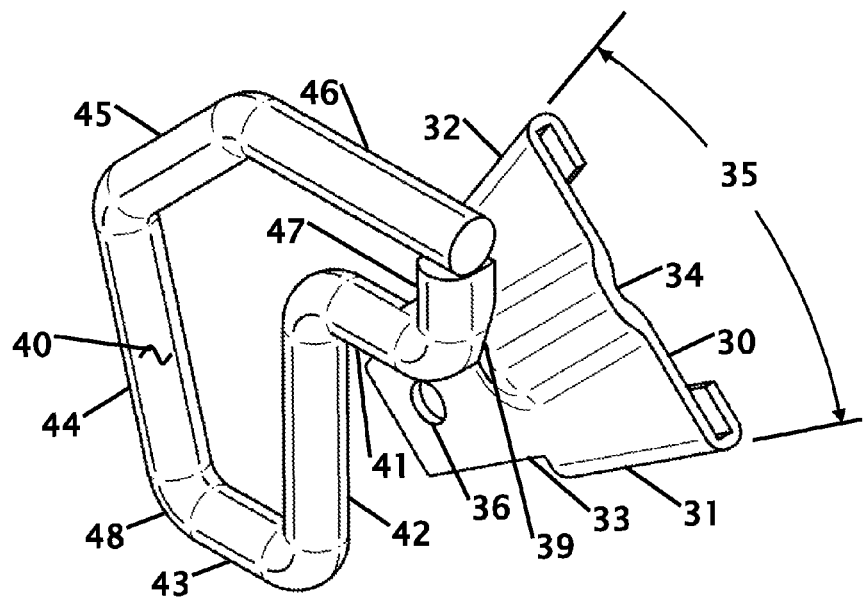
FIG. 2 shows a first perspective view of the caster wheel tilt bar.
Figure 3:
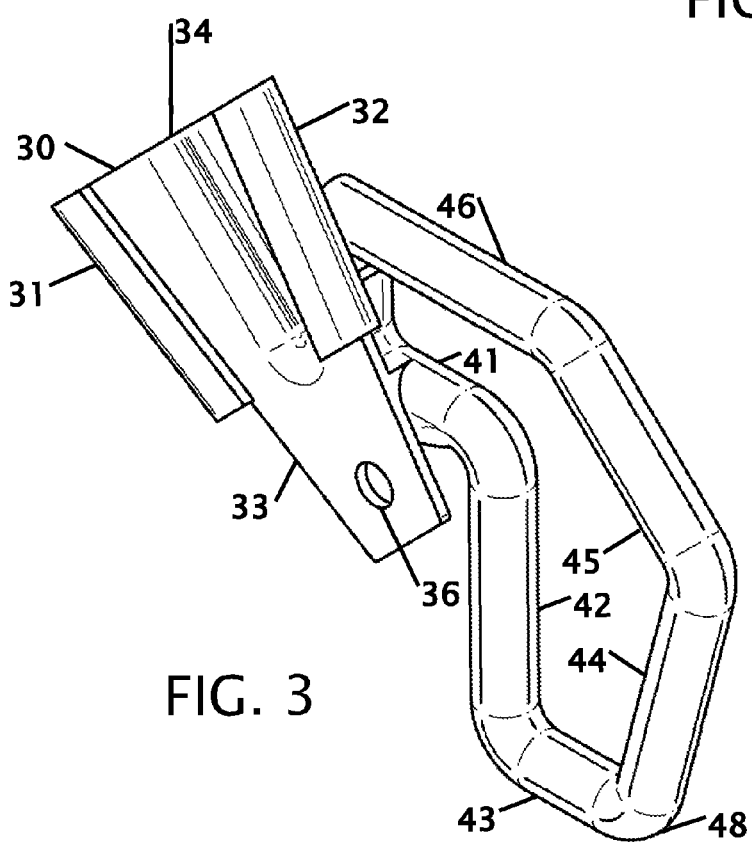
FIG. 3 shows a second perspective view of the caster wheel tilt bar.

FIG. 2 shows a first perspective view of the caster wheel tilt bar and FIG. 3 shows a second perspective view of the caster wheel tilt bar. These figures show the caster wheel tilt bar without the caster or the cart. While the shoe 30 is shown in a particular shape, it should be understood that different embodiments and shapes are contemplated depending upon the configuration of the caster. In general, only one caster wheel tilt bar is required per caster and the caster wheel tilt bar is only installed on one inside or outside support side, but could be installed on both sides of the caster frame. The caster wheel tilt bar can be installed on only one caster or a cart, but is generally placed on two casters that are placed either on the back or front wheels. In FIG. 2, the shoe 30 is shown with the side bends 31 and 32 bent to form a tapered angle 35. The tapered angle 35 is configuration to provide an interference or pinch fit on the caster leg. The shoe is shown with a flex or strengthening bend or ripple 34.

Figure 4:
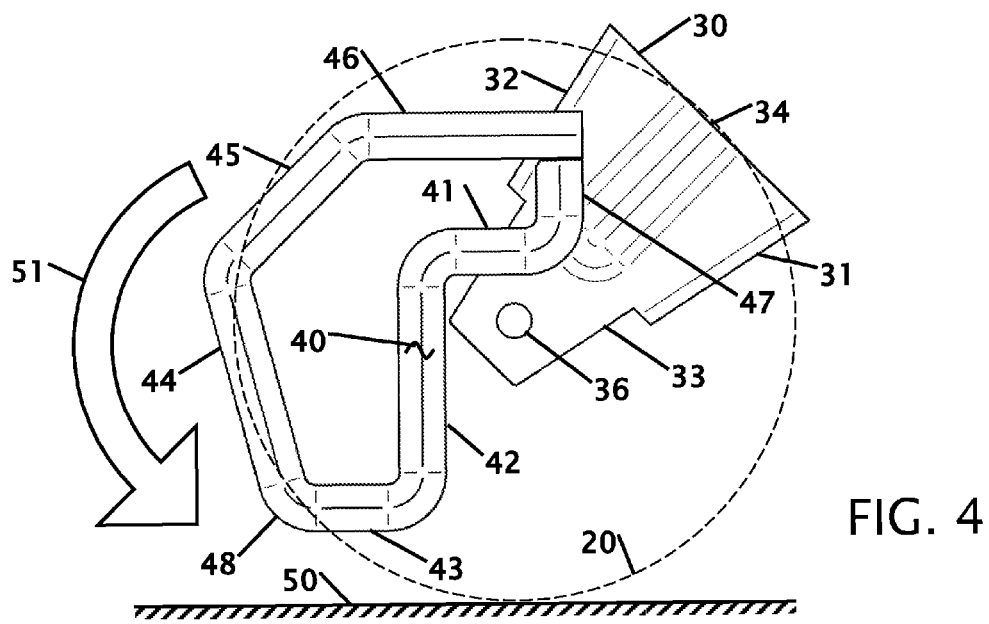
FIG. 4 shows a front plan view of the caster wheel tilt bar.
Figure 5:
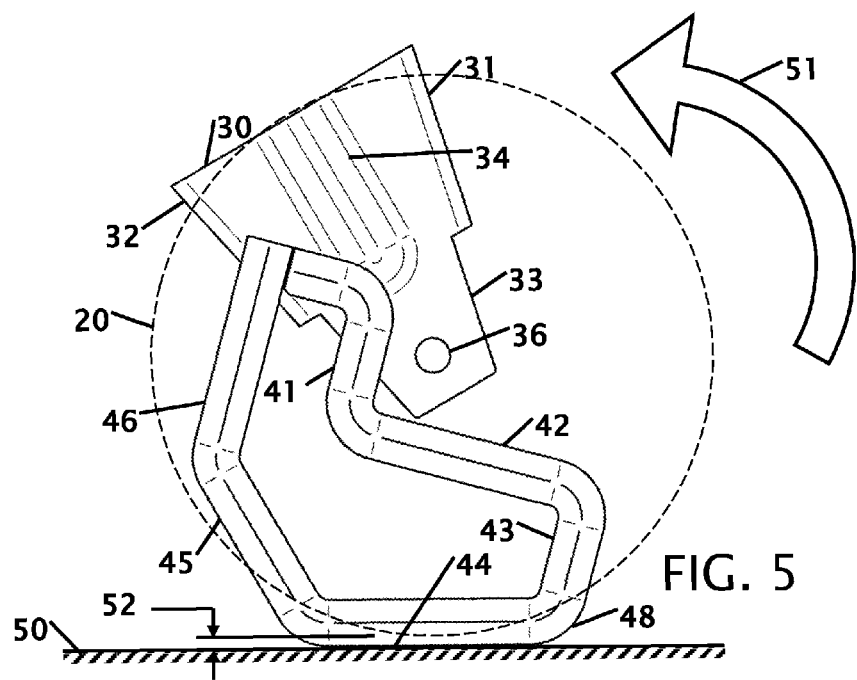
FIG. 5 shows a tilted plan view of the caster wheel tilt bar.

FIG. 4 shows a front plan view of the caster wheel tilt bar and FIG. 5 shows a tilted plan view of the caster wheel tilt bar. In FIG. 4 the caster with the wheel 20 is shown in a normal use where the caster can freely roll to move a cart. The activate the tilt bar 40, the cart is rotated on the wheel 20 until the leading edge 48 of the tilt bar 40 makes contact with the ground 50. Once contact is made with the ground, the cart is further rotated 51 and the wheel 20 will be lifted 52 off of the ground 50. The flat 44 area tilt bar 40 allows the cart to remain fairly balanced. Further rotation of the cart could rotate the cart and tilt bar to the flat 45. The angle of the flat section 44 is optimally selected as a balance point for the cart, but could be selected to provide an ideal point to dump or unload the cart.

When the cart is rotated in the opposite direction, the cart will be rotated over the leading edge 48 or curve so the wheel 20 will make contact with the ground 50 to allow the cart to be rolled without obstruction from the tilt bar. While a tilt bar 40 with only one flat 44 is shown, in this and previous figures, more or less than one flat is contemplated as shown and described in other figures herein.

Figure 6:
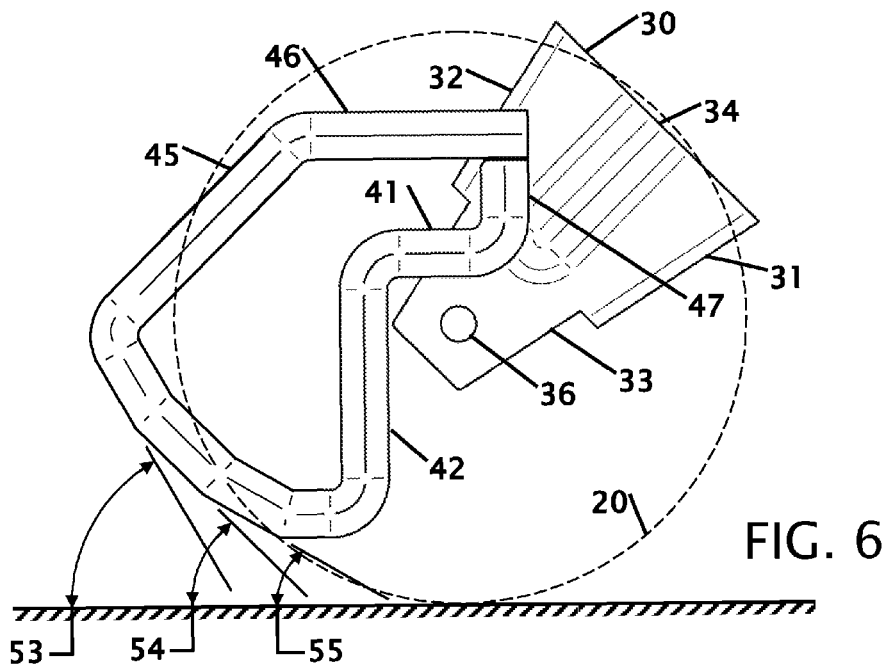
FIG. 6 shows an alternate preferred embodiment of the caster wheel tilt bar.

FIG. 6 shows an alternate preferred embodiment of the caster wheel tilt bar. This tilt bar shows three distinct flats that create angles 53, 54 and 55 to give the cart a plurality of angular resting points where an angled cart can be balanced with the wheel 20 elevated above the ground.

Figure 7:
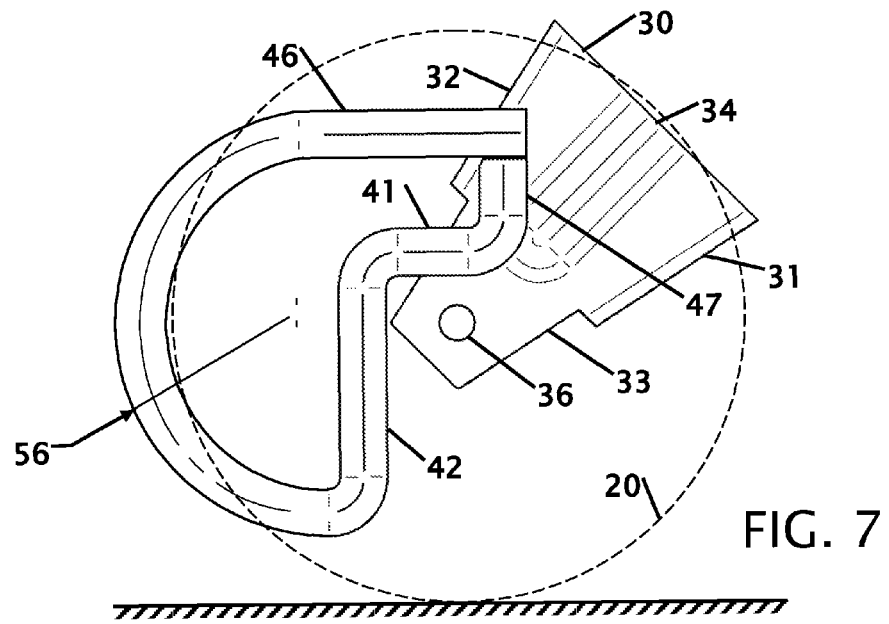
FIG. 7 shows another alternate preferred embodiment of the caster wheel tilt bar.

FIG. 7 shows another alternate preferred embodiment of the caster wheel tilt bar. This tilt bar is shown with an arc, curve or radius 56. This provides an infinite number of balance points for the cart with the wheel 20 off of the ground. In this embodiment, a user is not restricted by linear balance points to maintain a cart at balance with the center of gravity over the balance point of the tilt bar.

Figure 8:
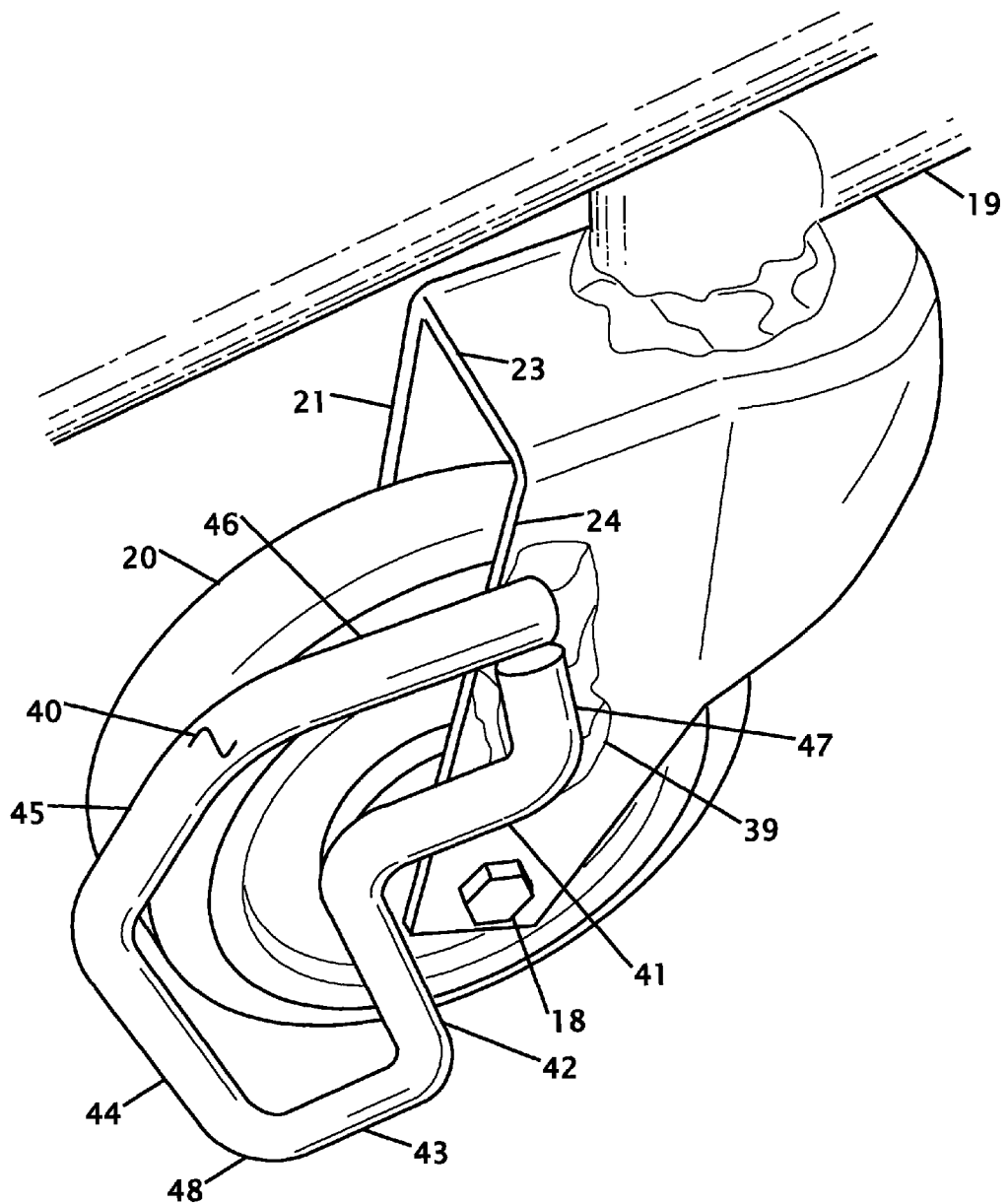
FIG. 8 shows a perspective view of the caster wheel tilt bar.

FIG. 8 shows a perspective view of the caster wheel tilt bar. In this embodiment, the caster wheel with a tilt bar utilizes the tilt bar 40 welded or otherwise integrated to the side 24 of the caster. The tilt bar 40 is formed in a loop that extends beyond the side face 24 of the caster. In this embodiment, the tilt bar 40 is shown with a series of bends and straights 41, 42, 43, 44, 45,46 and 47. The lower front bend 48 is generally the first point of contact when the cart 19 is rotated onto the resting edge 44 of the tilt bar 40. The tilt bar 40 at least partially extends beyond the wheel 20 to enable the tilt bar 40 to lift the wheel 20 off of a ground surface. It is further contemplated that the tilt bar 40 and the caster frames can be formed with an integrated tilt bar as a single member formed completely from sheet material. In the preferred embodiment, the tilt bar 40 is formed from bar or tubular material. As previously shown and described the tilt bar can curved, have one or multiple flats to balance the cart.

Thus, specific embodiments of a caster wheel tilt bar have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A caster wheel tilt bar comprising:
   a shoe;
   said shoe having a face plate and flanges on opposing elongated sides of said face plate;
   said flanges being bent from said face plate and wrapping at least partially around an inner surface of said face plate;
   said face plate and flanges being configured to engage on at least one side of a caster frame;
   a tilt bar secured to an outer surface of said face plate, and said tilt bar formed in a loop extends beyond said face plate.

2. The caster wheel tilt bar according to claim 1 wherein said face plate further includes a hole.

3. The caster wheel tilt bar according to claim 2 wherein said hole corresponds to an axle of said wheel.

4. The caster wheel tilt bar according to claim 3 wherein said tilt bar at least partially extends beyond said wheel.

5. The caster wheel tilt bar according to claim 4 wherein said tilt bar includes at least one straight section.

6. The caster wheel tilt bar according to claim 4 wherein said caster is connected to a cart whereby rotation of said cart rotates said caster and said caster wheel tilt bar to elevate said caster.

7. The caster wheel tilt bar according to claim 1 wherein said loop begins and terminates on said shoe.

8. The caster wheel tilt bar according to claim 1 wherein said tilt bar is formed from bar or tubular material.

9. The caster wheel tilt bar according to claim 1 wherein said shoe is tapered.

10. The caster wheel tilt bar according to claim 1 wherein said tilt bar is curved.

11. The caster wheel tilt bar according to claim 1 wherein said shoe pinch fits onto said caster frame.

* * * * *